(12) United States Patent
Wagner et al.

(10) Patent No.: US 8,616,067 B2
(45) Date of Patent: Dec. 31, 2013

(54) PRESSURE SENSOR ASSEMBLY

(75) Inventors: Chris Daniel Wagner, San Jose, CA (US); Dale Alan Gee, Los Gatos, CA (US); Derek Hubert McReavy, Minden, NV (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 13/307,834

(22) Filed: Nov. 30, 2011

(65) Prior Publication Data
US 2013/0133432 A1    May 30, 2013

(51) Int. Cl.
G01L 7/00    (2006.01)

(52) U.S. Cl.
USPC ............................................. 73/756

(58) Field of Classification Search
None
See application file for complete search history.

(56) References Cited

U.S. PATENT DOCUMENTS

| 7,992,445 | B2 | 8/2011 | Kobayashi et al. | |
|---|---|---|---|---|
| 8,028,584 | B2 | 10/2011 | Otsuka et al. | |
| 8,061,211 | B1 | 11/2011 | Bennett | |
| 2009/0291532 | A1* | 11/2009 | Takase et al. | 438/127 |
| 2011/0283802 | A1* | 11/2011 | Brown et al. | 73/706 |

* cited by examiner

Primary Examiner — Andre Allen
(74) Attorney, Agent, or Firm — Hiscock & Barclay LLP

(57) ABSTRACT

A pressure sensor assembly is disclosed wherein the substrate to which the pressure sensing die is mounted is decoupled from the package.

20 Claims, 2 Drawing Sheets

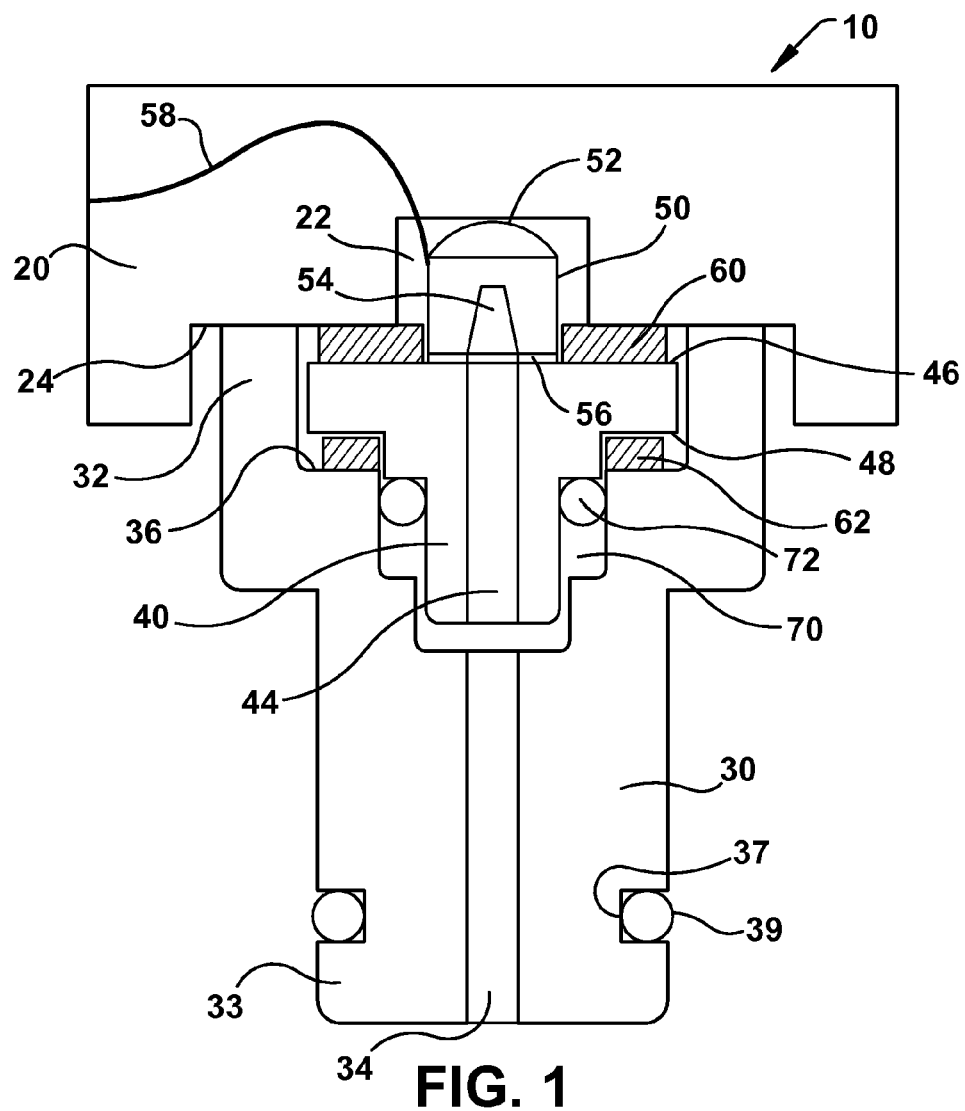
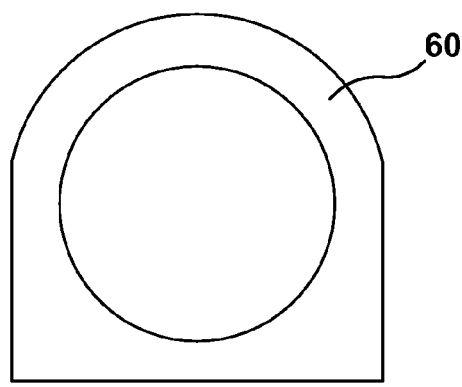

PRESSURE SENSOR ASSEMBLY

BACKGROUND OF THE INVENTION

The subject matter disclosed herein relates to pressure sensor assembly for measuring the pressure of a fluid.

Pressure sensor assemblies can include a pressure sensing die mounted to a substrate that is retained by a package. In one configuration, the pressure sensing die is exposed to a fluid (e.g., liquid or gas) that travels through a channel in the package and/or substrate in order to determine the pressure of the fluid. In some assemblies, the pressure sensing die and substrate are so strongly coupled with the package such that the die and/or substrate can crack or otherwise be damaged by energy transferred from the fluid to the die during spikes in pressure or when the pressure sensor assembly is subjected to vibrations or shocks.

The discussion above is merely provided for general background information and is not intended to be used as an aid in determining the scope of the claimed subject matter.

BRIEF DESCRIPTION OF THE INVENTION

A pressure sensor assembly for measuring the pressure of a fluid is disclosed, wherein the substrate to which the pressure sensing die is mounted is decoupled from the package. An advantage that may be realized in the practice of some disclosed embodiments of the pressure sensor assembly is the reduction in cracking or damage of the pressure sensing die caused by energy transferred from the fluid to the die during spikes in pressure or when the pressure sensor assembly is subjected to vibrations or shock.

In one embodiment, a pressure sensor assembly for measuring the pressure of a fluid is disclosed. The pressure sensor assembly comprises a first member, a second member comprising a first end coupled to the first member and a second end coupled to the source of the fluid, a substrate located in a first cavity formed between the first member and the second member, wherein a first side of the substrate faces a second side of the first member and a second side of the substrate faces a first side of the second member, a pressure sensing die mounted to the substrate, and an energy absorbing member between the first side of the substrate and the second side of the first member, wherein the energy absorbing member decouples the substrate from the first member. In another embodiment, the energy absorbing member is between the second side of the substrate and the first side of the second member, wherein the energy absorbing member decouples the substrate from the second member.

In yet another embodiment, a first set of protrusions extend from the second side of the first member toward the first side of the substrate, wherein the first set of protrusions decouple the substrate from the first member. In still another embodiment, a set of protrusions extend from the first side of the second member toward the second side of the substrate, wherein the set of protrusions decouple the substrate from the second member.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which:

FIG. 1 is an exemplary pressure sensor assembly;

FIG. 2 is an exemplary gasket used in the pressure sensor assembly of FIG. 1;

DETAILED DESCRIPTION OF THE INVENTION

Figure 3:
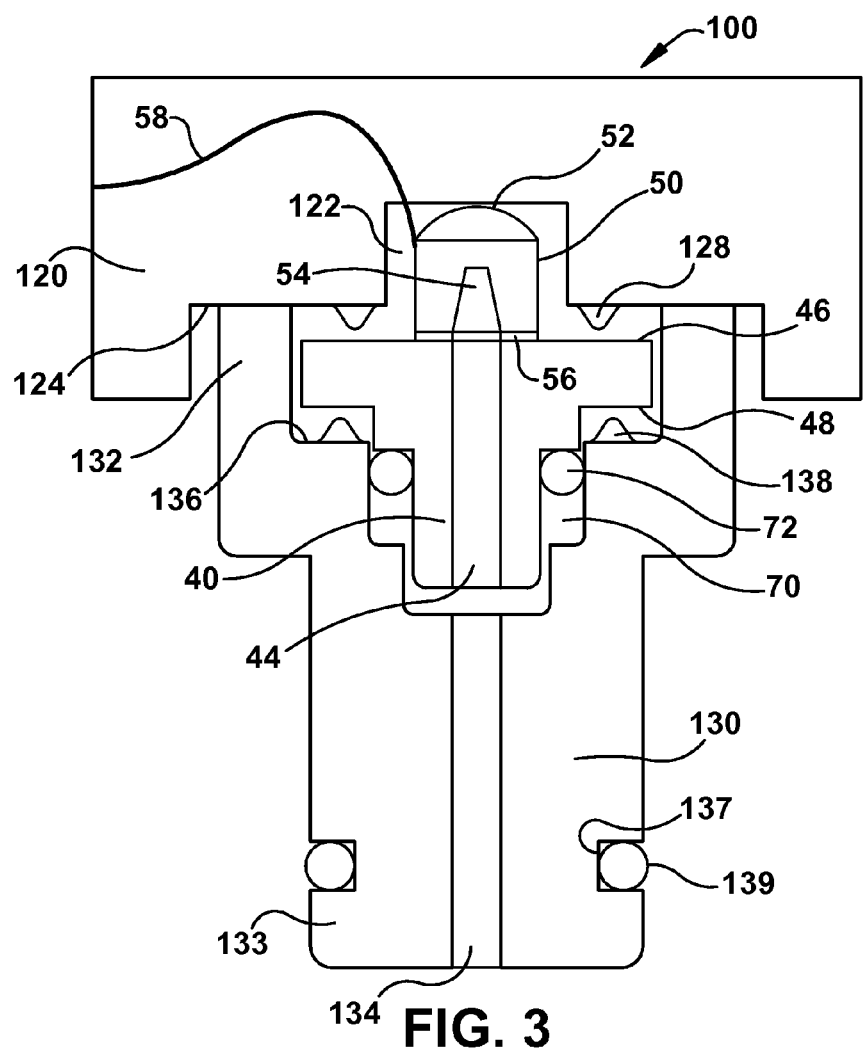
FIG. 3 is another exemplary pressure sensor assembly.

FIG. 1 is an exemplary pressure sensor assembly 10, which includes a sensor body 20 (or first member) coupled to a first end 32 of a sensor port 30 (or second member) that form the package for a substrate 40 to which a pressure sensing die 50 is mounted. The pressure sensing die 50 measures the pressure of a fluid (e.g., gas, liquid) that flows through the fluid channel 34 of the sensor port 30. The sensor port has a second end 33 coupled to the source of the fluid, then through the fluid channel 44 of the substrate 40, and then through the fluid channel 54 of the pressure sensing die 50, wherein the fluid channels 34, 44, 54 are aligned axially to allow a continuous fluid path. In the exemplary embodiment, the substrate 40 is a ceramic button. Although the exemplary embodiment employs a sensor body 20 and sensor port 30 enclosing the substrate 40, it will be understood that different members can be used to enclose the substrate 40.

The sensor body 20 can include a cavity 22 in which the pressure sensing die 50 is located. The pressure sensing die 50 can be mounted to the top side 46 of the substrate 40 using, e.g., a glass frit 56 to bond the pressure sensing die 50 onto the substrate 40. It will be understood that, in other embodiments, the pressure sensing die 50 can be mounted to the bottom side 48 of the substrate 40. It will be understood that the term "top side" as used herein refers to a side facing the sensor body 20, while the "bottom side" refers to a side facing the sensor port 30, regardless of the orientation of the pressure sensor assembly 10.

In one embodiment, the pressure sensing die 50 determines the pressure of the fluid to which the pressure sensing die 50 is exposed in the fluid channel 54 of the pressure sensing die 50. A gel cap 52 can be used to protect the electrical circuitry of the pressure sensing die 50 from the environment. In one embodiment, a silicon cap can be placed on the top of and integral to the pressure sensing die 50 that creates a vacuum chamber, where the reference vacuum is used for the pressure sensing die 50 to sense absolute pressure. Electrical leads 58 can connect the pressure sensing due 50 to monitoring equipment for reporting the pressure of the fluid.

The sensor port 30 can include a groove 37 in which an o-ring 39 can be placed to seal the connection with the source of the fluid flowing through the fluid channel 34 of the sensor port 30. The sensor port 30 forms a cavity 70 in which the substrate 40 is located. In another embodiment, the cavity 70 can be formed by the sensor body 20 or otherwise formed between the sensor body 20 and the sensor port 30. The substrate 40 is located in the cavity 70 such that the top side 46 of the substrate 40 faces the bottom side 24 of the sensor body 20 and the bottom side 48 of the substrate 40 faces the top side 36 of the sensor port 30. An o-ring 72 can be installed in the cavity 70 between the substrate 40 and the sensor port 30 to seal against the fluid flowing through pressure sensor assembly 10.

As shown in the exemplary pressure sensor assembly 10 of FIG. 1, a first gasket 60 or other energy absorbing member can be installed between the substrate 40 and the sensor body 20. In one embodiment, the first gasket 60 surrounds at least a portion of the pressure sensing die 50. This first gasket 60 decouples the top side 46 of the substrate 40 from the bottom side 24 of the sensor body 20, reducing the energy that can be transferred from the fluid, or from vibrations or shocks, to the pressure sensing die 50. For example, vibrations, shocks, or the pressure of the fluid flowing though the fluid channel 44 of the substrate 40 and the fluid channel 54 of the pressure sensing die 50 can cause the substrate 40 and pressure sensing die 50 to move towards and contact the sensor body 20. The first gasket 60 can absorb some of the energy caused by these events and reduce the amount of energy transferred to the pressure sensing die 50, thereby reducing the potential for cracking or damage to the pressure sensing die 50.

As shown in the exemplary pressure sensor assembly 10 of FIG. 1, a second gasket 62 or other energy absorbing member can be installed between the substrate 40 and the sensor port 30. In one embodiment, the second gasket 62 surrounds at least a portion of the substrate 40 and/or at least a portion of the fluid channels 34, 44, 54. The second gasket 62 decouples the bottom side 48 of the substrate 40 from the top side 36 of the sensor port 30, reducing the energy that can be transferred from the fluid, or from vibrations or shocks, to the pressure sensing die 50. For example, vibrations, shocks, or the pressure of the fluid flowing though the fluid channel 44 of the substrate 40 and the fluid channel 54 of the pressure sensing die 50 can cause the substrate 40 to move towards and contact the sensor port 30. The second gasket 62 can absorb some of the energy caused by these events and reduce the amount of energy transferred to the pressure sensing die 50, thereby reducing the potential for cracking or damage to the pressure sensing die 50.

FIG. 2 is an exemplary first gasket 60 used in the pressure sensor assembly 10 of FIG. 1. In this exemplary configuration, the first gasket 60 can be shaped to surround at least a portion of the pressure sensing die 50 mounted to the substrate 40. Although not shown, an exemplary second gasket 62 can be shaped to surround at least a portion of the substrate 40 and/or at least a portion of the fluid channels 34, 44, 54. The first gasket 60 and the second gasket 62 can have thicknesses, e.g., in the range of 0.010 in (0.254 mm) to 0.030 in. (0.762 mm). Exemplary thickness can include 0.015 in. (0.381 mm) and 0.020 in. (0.508 mm). It will be understood that the first gasket 60 and the second gasket 62 can have a number of different shapes and thicknesses. The first gasket 60 and the second gasket 62 can be made of an elastomeric material or other material that is compliant so as to absorb the energy of the fluid (or from e.g., the vibration or shock experienced by the pressure sensor assembly 10). Exemplary materials for the first gasket 60 and second gasket 62 can include, e.g., nitrile rubber, silicon rubber, or any other suitable elastomeric or other material. It will be understood that the first gasket 60 can be used with or without the second gasket 62, while the second gasket 62 can also be used with or without the first gasket 60.

FIG. 3 is another exemplary pressure sensor assembly 100, which includes a sensor body 120 coupled to a first end 132 of a sensor port 130 that form the package for a substrate 40 to which a pressure sensing die 50 is mounted. The pressure assembly 100 of FIG. 3 shares several of the same components of the pressure sensor assembly of FIG. 1, except the structure used to decouple the substrate 40 from the sensor body 120 and the sensor port 130. While separate gaskets 60, 62 were used in the pressure sensor assembly 10 of FIG. 1, the pressure sensor assembly 100 of FIG. 3 employs features that are integrated into the sensor body 120 and sensor port 130.

The pressure sensing die 50 measures the pressure of a fluid (e.g., gas, liquid) that flows through the fluid channel 134 of the sensor port 130. The sensor port 130 has a second end 133 coupled to the source of the fluid, then through the fluid channel 44 of the substrate 40, and then through the fluid channel 54 of the pressure sensing die 50, wherein the fluid channels 134, 44, 54 are aligned axially to allow a continuous fluid path. In the exemplary embodiment, the substrate 40 is a ceramic button.

The sensor body 120 can include a cavity 122 in which the pressure sensing die 50 is located. The pressure sensing die 50 can be mounted to the top side 46 (or first side) of the substrate 40 using, e.g., a glass frit 56 to bond the pressure sensing die 50 onto the substrate 40. It will be understood that, in other embodiments, the pressure sensing die 50 can be mounted to the bottom side 48 of the substrate 40. It will be understood that the term "top side" as used herein refers to a side facing the sensor body 120, while the "bottom side" refers to a side facing the sensor port 130, regardless of the orientation of the pressure sensor assembly 100.

In one embodiment, the pressure sensing die 50 determines the pressure of the fluid to which the pressure sensing die 50 is exposed in the fluid channel 54 of the pressure sensing die 50. A gel cap 52 can be used to protect the electrical circuitry of the pressure sensing die 50 from the environment. In one embodiment, a silicon cap can be placed on the top of and integral to the pressure sensing die 50 that creates a vacuum chamber, where the reference vacuum is used for the pressure sensing die 50 to sense absolute pressure. Electrical leads 58 can connect the pressure sensing due 50 to monitoring equipment for reporting the pressure of the fluid.

The sensor port 130 can include a groove 137 in which an o-ring 139 can be placed to seal the connection with the source of the fluid flowing through the fluid channel 134 of the sensor port 130. The sensor port 130 forms a cavity 70 in which the substrate 40 is located. In another embodiment, the cavity 70 can be formed by the sensor body 120 or otherwise formed between the sensor body 120 and the sensor port 130. The substrate 40 is located in the cavity 70 such that the top side 46 of the substrate 40 faces the bottom side 124 of the sensor body 120 and the bottom side 48 of the substrate 40 faces the top side 136 of the sensor port 130. An o-ring 72 can be installed in the cavity 70 between the substrate 40 and the sensor port 130 to seal against the fluid flowing through pressure sensor assembly 10.

As shown in the exemplary pressure sensor assembly 100 of FIG. 3, a first set of protrusions 128 extend from the bottom side 124 of the sensor body 120 toward the top side 46 of the substrate 40. In one embodiment, the first set of protrusions 128 surround at least a portion of the pressure sensing die 50. The first set of protrusions 128 decouple the top side 46 of the substrate 40 from the bottom side 124 of the sensor body 120, reducing the energy that can be transferred from the fluid, or from vibrations or shocks, to the pressure sensing die 50. For example, vibrations, shocks, or the pressure of the fluid flowing though the fluid channel 44 of the substrate 40 and the fluid channel 54 of the pressure sensing die 50 can cause the substrate 40 and pressure sensing die 50 to move towards and contact the sensor body 120. The first set of protrusions 128 can absorb some of the energy caused by these events and reduce the amount of energy transferred to the pressure sensing die 50, thereby reducing the potential for cracking or damage to the pressure sensing die 50.

As shown in the exemplary pressure sensor assembly 100 of FIG. 3, a second set of protrusions 138 extend from the top side 136 of the sensor port 130 toward the bottom side 48 of the substrate 40. In one embodiment, the second set of protrusions 138 surround at least a portion of the substrate 40 and/or at least a portion of the fluid channels 134, 44, 54. The second set of protrusions 138 decouple the bottom side 48 of the substrate 40 from the top side 136 of the sensor port 130, reducing the energy that can be transferred from the fluid, or from vibrations or shocks, to the pressure sensing die 50. For example, vibrations, shocks, or the pressure of the fluid flowing though the fluid channel 44 of the substrate 40 and the fluid channel 54 of the pressure sensing die 50 can cause the substrate 40 to move towards and contact the sensor port 30. The second set of protrusions 138 can absorb some of the energy caused by these events and reduce the amount of energy transferred to the pressure sensing die 50, thereby reducing the potential for cracking or damage to the pressure sensing die 50.

Figure 4:
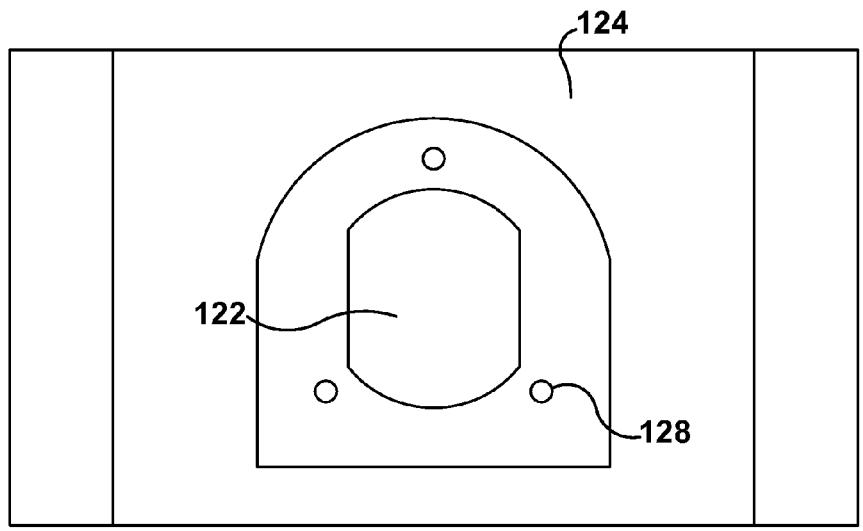
FIG. 4 is a perspective view of the bottom side of the exemplary sensor body of FIG. 3.

FIG. 4 is a perspective view of the bottom side 124 of the exemplary sensor body 120 showing the first set of protrusions 128. In this exemplary configuration, the first set of protrusions 128 can be located to surround at least a portion of the pressure sensing die 50 mounted to the substrate 40. Although not shown in FIG. 4, an exemplary set of second protrusions 138 on the sensor port 130 can be located to surround at least a portion of the substrate 40. The first set of protrusions 128 and the second set of protrusions 138 can have a height in the range of, e.g., 0.005 in (0.127 mm) to 0.030 in. (0.762 mm). Exemplary heights include, e.g., 0.010 in (0.254 mm) and 0.015 in. (0.381 mm). It will be understood that the first set of protrusions 128 and the second set of protrusions 138 can have a number of different shapes (e.g., hemispherical, ring, half toroid, round ridge, ribs) and heights where the protrusions 128, 138 can deform a small amount.

In one embodiment, the first set of protrusions 128 and the second set of protrusions 138 can be molded as part of the sensor body 120 and sensor port 130, respectively. Exemplary plastic materials that can absorb the energy of the fluid (or from, e.g., the vibration or shock experienced by the pressure sensor assembly 100) for the sensor body 120 and sensor port 130 (and the first set of protrusions 128 and the second set of protrusions 138) can include, e.g., nylon or PBT. It will be understood that the first set of protrusions 128 can be used with or without the second set of protrusions 138, while the second set of protrusions 138 can also be used with or without the first set of protrusions 128.

In one embodiment, the material and height of the first set of protrusions 128 and the second set of protrusions 138 can be chosen such that the substrate 40 is coupled to the protrusions 128, 138 and therefore the sensor body 120 and sensor port 130 during manufacturing. However, afterwards, material creep can occur, causing the protrusions 128, 138 to deform and, e.g., lower in height, decoupling the substrate 40 from the sensor body 120 and the sensor port 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pressure sensor assembly for measuring the pressure of a fluid comprising:
    a first member;
    a second member comprising a first end coupled to the first member and a second end coupled to the source of the fluid;
    a substrate located in a first cavity formed between the first member and the second member, wherein a first side of the substrate faces a second side of the first member and a second side of the substrate faces a first side of the second member;
    a pressure sensing die mounted to the substrate; and
    a first energy absorbing member between the first side of the substrate and the second side of the first member, wherein the first energy absorbing member decouples the substrate from the first member.

2. The pressure sensor assembly of claim 1, wherein:
    the second member further comprises a first fluid channel through which the fluid flows from the source of the fluid;
    the substrate further comprises a second fluid channel through which the fluid flows from the source of the fluid;
    the pressure sensing die further comprises a third fluid channel through which the fluid flows from the source of the fluid; and
    wherein the first, second, and third fluid channels are configured to allow a continuous fluid path through the first, second, and third fluid channels.

3. The pressure sensor assembly of claim 1 further comprising a second cavity formed by the first member, wherein the pressure sensing die is located in the second cavity.

4. The pressure sensor assembly of claim 1, wherein the first energy absorbing member surrounds at least a portion of the pressure sensing die.

5. The pressure sensor assembly of claim 1 further comprising a second energy absorbing member between the second side of the substrate and the first side of the second member, wherein the second energy absorbing member decouples the substrate from the second member.

6. The pressure sensor assembly of claim 2 further comprising a second energy absorbing member between the second side of the substrate and the first side of the second member, wherein the second energy absorbing member decouples the substrate from the second member, wherein the second energy absorbing member surrounds at least a portion of the first fluid channel, the second fluid channel, or the third fluid channel.

7. The pressure sensor assembly of claim 1, wherein the first member is a sensor body.

8. The pressure sensor assembly of claim 1, wherein the second member is a sensor port.

9. The pressure sensor assembly of claim 1, wherein the first energy absorbing member is a gasket.

10. The pressure sensor assembly of claim 5, wherein the second energy absorbing member is a gasket.

11. A pressure sensor assembly for measuring the pressure of a fluid comprising:
   a first member;
   a second member comprising a first end coupled to the first member and a second end coupled to the source of the fluid;
   a substrate located in a first cavity formed between the first member and the second member, wherein a first side of the substrate faces a second side of the first member and a second side of the substrate faces a first side of the second member;
   a pressure sensing die mounted to the substrate; and
   a first energy absorbing member between the second side of the substrate and the first side of the second member, wherein the first energy absorbing member decouples the substrate from the second member.

12. The pressure sensor assembly of claim 11, wherein the first energy absorbing member is a gasket.

13. A pressure sensor assembly for measuring the pressure of a fluid comprising:
   a first member;
   a second member comprising a first end coupled to the first member and a second end coupled to the source of the fluid;
   a substrate located in a first cavity formed between the first member and the second member, wherein a first side of the substrate faces a second side of the first member and a second side of the substrate faces a first side of the second member;
   a pressure sensing die mounted to the substrate; and
   a first set of protrusions extending from the second side of the first member toward the first side of the substrate, wherein the first set of protrusions decouple the substrate from the first member.

14. The pressure sensor assembly of claim 13, wherein:
   the second member further comprises a first fluid channel through which the fluid flows from the source of the fluid;
   the substrate further comprises a second fluid channel through which the fluid flows from the source of the fluid;
   the pressure sensing die further comprises a third fluid channel through which the fluid flows from the source of the fluid; and
   wherein the first, second, and third fluid channels are configured to allow a continuous fluid path through the first, second, and third fluid channels.

15. The pressure sensor assembly of claim 13, wherein the first set of protrusions surround at least a portion of the pressure sensing die.

16. The pressure sensor assembly of claim 13 further comprising a second set of protrusions extending from the first side of the second member, wherein the second set of protrusions decouple the substrate from the second member.

17. The pressure sensor assembly of claim 14 further comprising a second set of protrusions extending from the first side of the second member, wherein the second set of protrusions surround at least a portion of the first fluid channel, the second fluid channel, or the third fluid channel.

18. The pressure sensor assembly of claim 13, wherein the first member is a sensor body.

19. The pressure sensor assembly of claim 13, wherein the second member is a sensor port.

20. A pressure sensor assembly for measuring the pressure of a fluid comprising:
   a first member;
   a second member comprising a first end coupled to the first member and a second end coupled to the source of the fluid;
   a substrate located in a first cavity formed between the first member and the second member, wherein a first side of the substrate faces a second side of the first member and a second side of the substrate faces a first side of the second member;
   a pressure sensing die mounted to the substrate; and
   a first set of protrusions extending from the first side of the second member toward the second side of the substrate, wherein the first set of protrusions decouple the substrate from the second member.

* * * * *